United States Patent
Haustein et al.

(10) Patent No.: US 7,549,111 B2
(45) Date of Patent: Jun. 16, 2009

(54) APPARATUS, SYSTEM, AND METHOD FOR CONVERTING BETWEEN SERIAL DATA AND ENCODED HOLOGRAPHIC DATA

(75) Inventors: Nils Haustein, Zornheim (DE); Craig Anthony Klein, Tucson, AZ (US); Henry Zheng Liu, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 11/231,615

(22) Filed: Sep. 21, 2005

(65) Prior Publication Data

US 2007/0101244 A1    May 3, 2007

(51) Int. Cl.
*H03M 13/03* (2006.01)
*G11B 7/00* (2006.01)

(52) U.S. Cl. .......................... 714/786; 369/103
(58) Field of Classification Search ................. 369/103; 359/1, 22, 24, 35; 714/799, 805, 746, 786
See application file for complete search history.

(56) References Cited

U.S. PATENT DOCUMENTS

| 5,060,221 | A | 10/1991 | Sako et al. ................ 369/59 |
|---|---|---|---|
| 6,128,109 | A | 10/2000 | Jenkins et al. ............... 359/11 |
| 6,160,782 | A * | 12/2000 | Kayanuma et al. ........... 369/103 |
| 2002/0135502 | A1 | 9/2002 | Lu ............................. 341/107 |
| 2003/0028359 | A1 | 2/2003 | Eggert et al. .................. 703/2 |
| 2003/0067992 | A1 | 4/2003 | Karaoguz et al. ............ 375/265 |
| 2004/0028222 | A1 | 2/2004 | Sewell et al. .................. 380/28 |
| 2004/0037202 | A1 | 2/2004 | Brommer et al. ............. 369/94 |
| 2004/0125880 | A1 | 7/2004 | Emami et al. ............... 375/260 |

* cited by examiner

*Primary Examiner*—Shelly A Chase
(74) *Attorney, Agent, or Firm*—Kunzler & McKenzie

(57) ABSTRACT

An apparatus, system, and method are disclosed for converting between serial data and encoded holographic data. The apparatus for converting between serial data and encoded holographic data is provided with a logic unit containing a plurality of modules configured to functionally execute the necessary steps of reading data signals from and writing data signals to a data bus on a computing device, converting between a serial data stream and an encoded data image, and reading data from and writing data to a holographic storage medium. From the foregoing discussion, it should be apparent that a need exists for an apparatus, system, and method for converting between serial data and encoded holographic data. Beneficially, such an apparatus, system, and method would encode backup information directly with the data as it is written to the storage medium.

24 Claims, 10 Drawing Sheets

US 7,549,111 B2

APPARATUS, SYSTEM, AND METHOD FOR CONVERTING BETWEEN SERIAL DATA AND ENCODED HOLOGRAPHIC DATA

BACKGROUND OF THE INVENTION

1. Field of the Invention

This invention relates to optical data storage and more particularly relates to converting between serial data and encoded holographic data.

2. Description of the Related Art

Advances in optical data storage systems are rapidly increasing data storage capacity. For example, with the holographic data storage systems available from InPhase Technologies™ up to 150 GB of data storage space is available on a holographic medium the size of a Compact Disk ("CD"). That capacity adds up to nearly 200 times the traditional data storage capacity of the CD.

Prior Art FIG. 1A illustrates one a hologram recording device. A typical holographic recording device includes a laser light source 102, a laser splitter 104, and a resultant data carrier beam 106 and reference beam 108. The apparatus may additionally include a Spatial Light Modulator ("SLM") 112, a mirror 116, and a holographic data storage medium 122.

Generally, the SLM 112 is an LCD type device. Data is represented by either a light or a dark pixel on the SLM 112 display. The SLM 112 is typically translucent. Laser light originating from the laser source 102 is split by the beam splitter 104 into two beams, a carrier beam 106 and a reference beam 108. The carrier beam 106 picks up the image 110 displayed by the SLM 112 as the light passes through the SLM 112. The result is a propagating image 114. The reference beam 108 is reflected by the mirror 116 into the path of the propagating image 114. When the reflected reference beam 118 interferes with the propagating image 114, a hologram 120 is formed. The resulting hologram 120 may be stored on a holographic storage medium 122.

Prior Art FIG. 1B illustrates a hologram reading device. The reading device includes the same laser light source 102, beam splitter 104, and holographic storage medium 122. Additionally, an optical sensor 126 is positioned a distance away from the holographic storage medium 122 sufficient to accurately capture the image 124 projected. To read the hologram, only the reflected reference beam 118 is incident on the holographic storage medium 122. As the reference beam 118 interferes with the hologram stored on the storage medium 122, an image 124 resembling the original image 110 displayed by the SLM 112 is projected against the optical sensor 126. The optical sensor 126 then captures the data.

An additional feature of currently available holographic storage devices is the rate at which data may be written to and read from the medium. In holographic storage systems, the data is stored as a planar optical image. Each medium may contain several images, and each image is capable of storing several megabytes of data. In such systems, each image is written to the medium and read from the medium with a single flash of laser light. Consequently, several megabytes of data may be written to the medium or read from the medium with a single pulse of light.

While these new advances solve some capacity and size issues, some common issues have still not been resolved. For example, critical data must still be stored redundantly, and corrupt or lost data must still be recovered in some way. Holographic storage systems may contain more data and store that data more quickly, however the common tasks of creating backup copies, performing data recovery operations, and the like must still be considered.

Typical data backup solutions are often cumbersome, costly, and inefficient. As Most backup solutions require procuring and configuring a second storage device for each storage device utilized. These second storage devices contain a backup copy of the data stored on the primary storage device. These backup devices are expensive, require considerable time to configure and maintain, and severely tax system and network bandwidth resources in continually creating and updating the backup copies of the data.

For example, a typical data storage system utilizing magnetic hard disks may include an array of four disks. For redundancy, each of the four disks must have an associated backup disk. Up front, the cost of the system is doubled to gain the benefits of redundancy. Furthermore, a system administrator must configure the backup disks to mirror the data on the primary storage disks, or create a backup and update process. The added network bandwidth required to continually create and update the backup copies of the data may require more bandwidth, leaving less bandwidth for the system users and other operations required to administer the storage system and associated networks.

Although holographic data storage systems may improve data read and write rates, and provide additional space for backup copies, the issue of reliability and redundancy still remains. What is needed is a data storage solution that maintains the integrity of data, provides data recovery capabilities, and maintains high storage capacities and rapid read data access rates, without requiring procurement and configuration of multiple sets of hardware components, and without negatively impacting network bandwidth usage.

From the foregoing discussion, it should be apparent that a need exists for an apparatus, system, and method for converting between serial data and encoded holographic data. Beneficially, such an apparatus, system, and method would encode backup information directly with the data as it is written to the storage medium, and make use of the high data access rates available with current holographic storage mediums such that data access rates would not be perceivably impacted. Additionally, network bandwidth utilization for backup copy creation and updates would be eliminated.

SUMMARY OF THE INVENTION

The present invention has been developed in response to the present state of the art, and in particular, in response to the problems and needs in the art that have not yet been fully solved by currently available optical storage systems. Accordingly, the present invention has been developed to provide an apparatus, system, and method for converting between serial data and encoded holographic data that overcome many or all of the above-discussed shortcomings in the art.

The apparatus for converting between serial data and encoded holographic data is provided with a logic unit containing a plurality of modules configured to functionally execute the necessary steps of converting between a serial data stream and an encoded data image, facilitating data communication between a conversion module and a serial data connection, and facilitating data communication between a conversion module and a holographic storage medium. These modules in the described embodiments include a conversion module, a serial data interface, and a holographic data interface.

In one embodiment, the conversion module further comprises an encoding module configured to encode serial bits of data received from the serial data interface into matrices of convolution encoded data. The encoding module may be further configured to generate a two dimensional matrix for storage on the holographic medium. In another embodiment, the encoding module is configured to generate a three dimensional matrix for storage on the holographic medium.

In one embodiment, the conversion module may further comprise a decoding module configured to trellis-decode encoded-matrices received from the holographic storage medium into serial bits of data. In a particular embodiment, the apparatus may further comprise a recovery module configured to use information regarding the missing data obtained by the decoding module to recover missing data.

The apparatus may additionally comprise an assembly module configured to assemble a group of encoded data into an optical image for simultaneous storage on a holographic medium. The assembler module may further comprise a distribution module configured to distribute the matrices among a plurality of holographic storage mediums according to a predetermined pattern.

A system of the present invention is also presented for converting between serial data and encoded holographic data. In one embodiment, the system includes a computing device with a serial data bus. The system may additionally include a data controller configured to read data signals from and write data signals to a serial data bus on the computing device, convert between a serial data stream and a convolution encoded data image, and read data from and write data to a holographic storage medium. Additionally, the system may include a holographic storage medium.

In a further embodiment, the controller is configured to distribute the convolution encoded data images across a plurality of holographic storage mediums. Additionally, the controller may be configured to recover data missing from a first set of holographic data using information obtained from trellis decoding one or more associated sets of holographic data. The sets of holographic data may be stored on separate storage mediums.

A method of the present invention is also presented for converting between serial data and encoded holographic data. The method in the disclosed embodiments substantially includes the steps necessary to carry out the functions presented above with respect to the operation of the described apparatus and system. In one embodiment, the method includes interfacing with a serial data connection, converting between a serial data stream and an encoded data image, and interfacing with a holographic storage medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
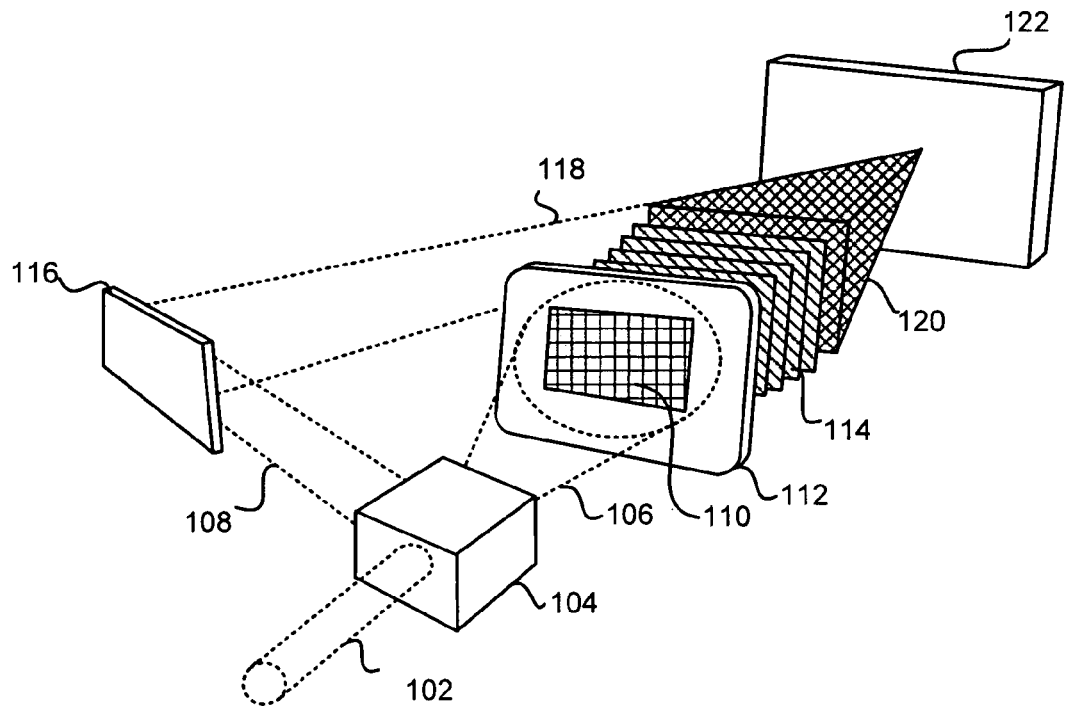
FIG. 1A is a schematic block diagram illustrating one embodiment of a hologram recording device of the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-versatile disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The term "serial data" as used herein refers to data communicated in a chronological order in accordance with a system clock cycle, or other means for timing signal transitions. Furthermore, serial data may be further interpreted to include a sequence of electrical, optical, or other signal, wherein the state of the signal sequentially transitions to represent data. For example, data communications across a serial communication port using RS-232 is one example of serial data. Indeed, in accordance with the present definition of serial data, a parallel port communication may be considered serial data. In the case of a parallel port communication, the factor of state transitions according to a sequence representing data is present. The fact that multiple lines transmit data simultaneously does not diminish the fact that each line is, in fact transmitting serial data in accordance with the present definition.

Figure 2:
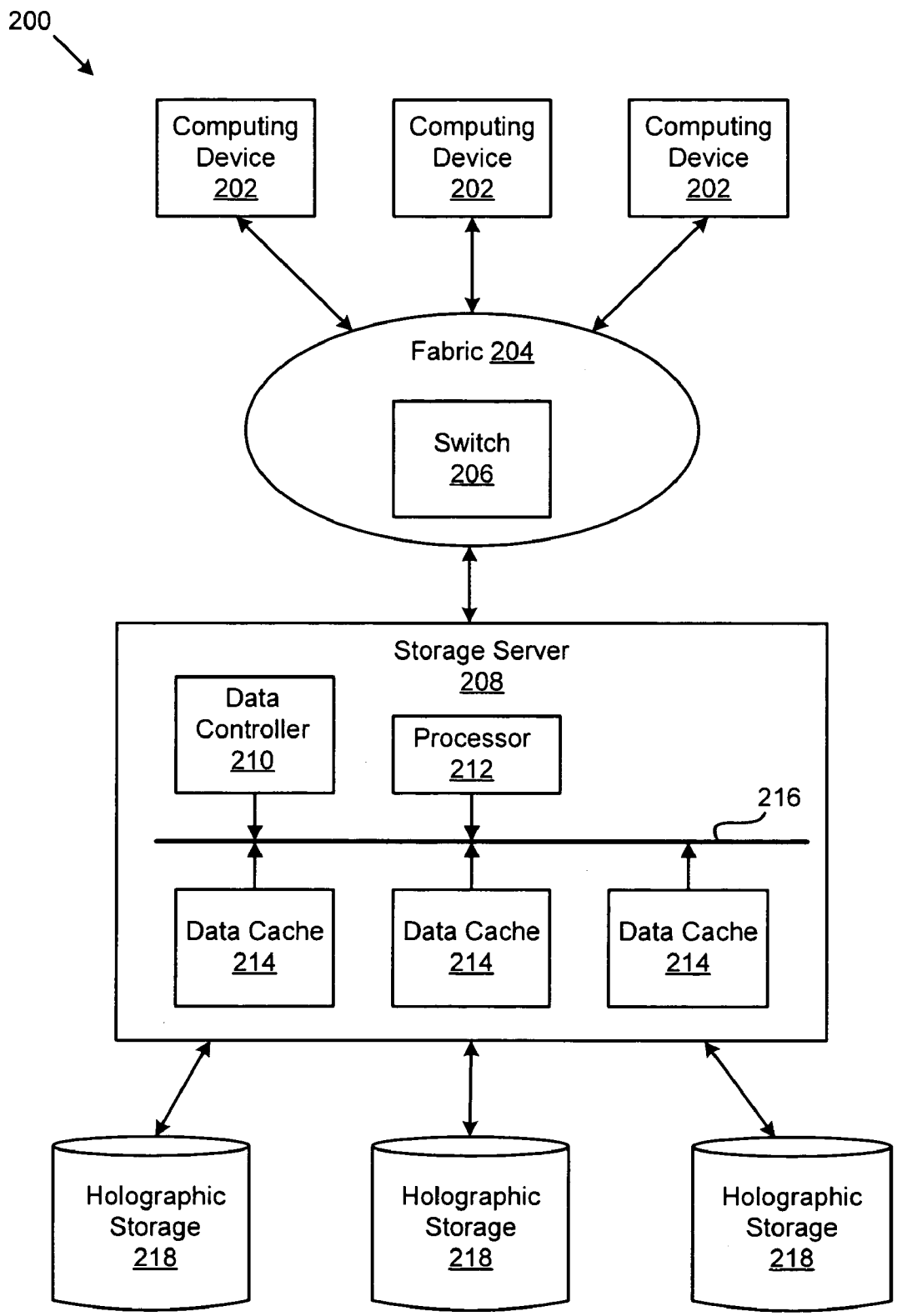
FIG. 2 is a schematic block diagram illustrating one embodiment of a system for converting between serial data and encoded holographic data in accordance with the present invention.

FIG. 2 depicts one embodiment of a system 200 for converting between serial data and encoded holographic data. The system 200 may comprise a Storage Area Network ("SAN"). In one embodiment, the system 200 includes one or more computing devices 202. The computing devices 202 may communicate with a storage server 208 through a data communication fabric 204. The fabric 204 may include one or more data switches 206. The storage server 208 may additionally communicate with one or more holographic storage mediums 218.

A computing device 202 may include an application server, a web server, a work station, or other like device from which serial data is likely to originate. The computing device 202 may be connected to the fabric 206 using Small Computer Systems Interface ("SCSI") protocol running over a Fibre Channel ("FC") physical layer. Alternatively, the connection may utilize other protocols, such as Infiniband, Ethernet, or Internet SCSI ("iSCSI"). The switches 206 may be configured to route traffic from the computing devices 202 directly to the storage server 208.

In one embodiment, the storage server 208 includes a data controller 210, a processor 212, and one or more data caches 214. These components may communicate through a data bus 216. In one embodiment, the data controller 210 is configured to read data signals from and write data signals to a serial data bus on the computing device 202. Alternatively, the data controller may be configured to read data signals from and write data signals to the computing device through the data bus 216 and the fabric 204. Additionally, the data controller 210 is configured to convert between a serial data stream and a convolution encoded data image. The data controller 210 may additionally read data from and write data to one or more of the holographic storage mediums 218.

In one embodiment, the data controller 210 may write data to a plurality of data caches 214 for assembly of an optical image. The optical images are then stored on the holographic storage mediums 218. In one embodiment, the storage mediums 218 may be in different geographical locations so that the loss of a building only results in the loss of one of these storage mediums, which aids in the disaster recovery of the stored data. In such an embodiment, the data controller 210 may distribute data between the holographic storage mediums 218 in order to protect the data. If the data controller 210 encodes three bits of data into three 2×2 matrices, and the three matrices are distributed across three separate holographic storage devices 218, data lost on one of the storage devices 218 may be recovered from the encoded information stored with the data in the other two storage devices 218. Further details of the data recovery process are described in detail with respect to FIGS. 7 and 10.

Figure 3A:
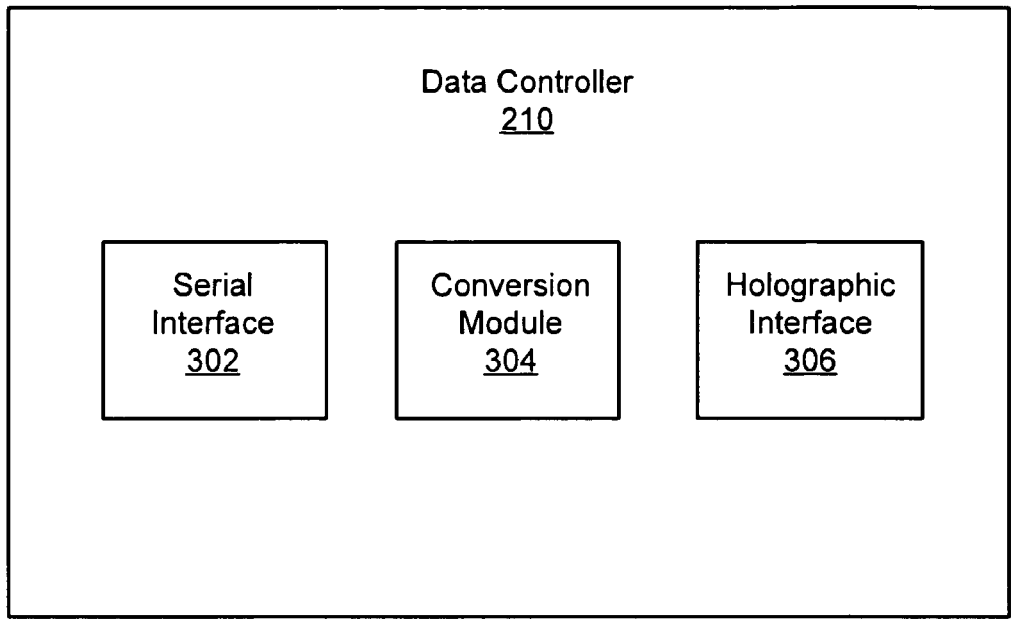
FIG. 3A is a schematic block diagram illustrating one embodiment of an apparatus for converting between serial data and encoded holographic data.

FIG. 3A illustrates one embodiment of an apparatus for converting between serial data and encoded holographic data. In one embodiment, the apparatus is the data controller 210. The data controller 210 may comprise a serial data interface 302, a conversion module 304, and a holographic data interface 306.

In one embodiment, the serial data interface 302 is configured to interface with a serial data connection. In particular, interfacing may include reading data from and writing data to a serial data bus. For example, the data controller 210 may receive data from the computing device 202 on the data bus 216. The serial data connection may further include an FC connection through an FC fabric 204. In such an embodiment, the serial data is carried by light pulses on a fiber optic medium. However, the data still arrives at the data controller 210 in a serial manner. Alternatively, the serial data connection may include Ethernet, iSCSI, SCSI, or the like. Despite the fact that some of these connection mechanisms pass data in what is typically considered a parallel manner, under the definition of serial data presented herein, each of these methods still constitutes a serial data connection, because each mechanism promulgates data bits in a time sequential order according to transitions of a clock signal.

The conversion module 304 is configured to convert between a serial data stream and an encoded data image. In a further embodiment, the conversion module 304 may use convolution encoding to generate multidimensional matrices of encoded data for storage as a data image. For example, the conversion module may take one megabyte of data from a serial data connection such as a SCSI connection and read the data into a Random Access Memory. The conversion module 304 may then use convolution encoding to convert the serial data from a serial stream to an encoded data matrix. The matrix may include information regarding adjacent bits entering from the serial data connection. Depending on the convolution encoding algorithm used, various sizes and number of dimensions of resulting matrices may be generated by the conversion module 304. For example, data may be stored in a 2×2 matrix, a 3×3 matrix, a 3×3×3 matrix, or the like.

Figure 1B:
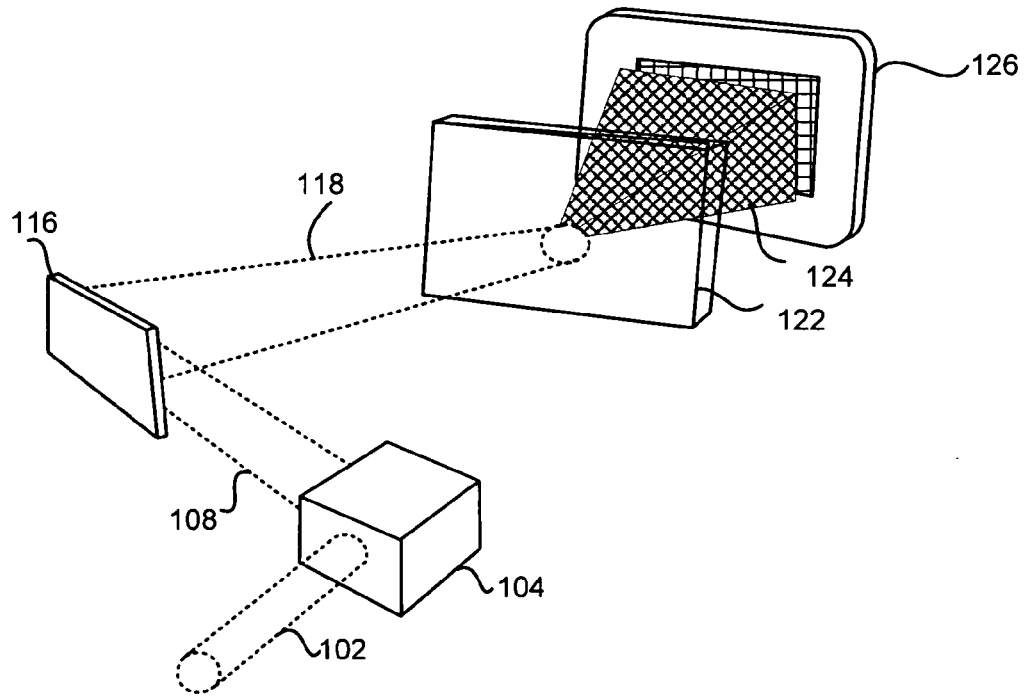
FIG. 1B is a schematic block diagram illustrating one embodiment of a hologram reading device of the prior art.

The holographic data interface 306 is configured to interface with a holographic storage medium. In one embodiment, the holographic data interface 306 may include components of the holographic recording device, and the holographic reading device described with relation to FIGS. 1A and 1B. Additionally, the holographic interface module may provide access to data from distributed holographic mediums, or distributed sectors of the same holographic storage medium.

Figure 3B:
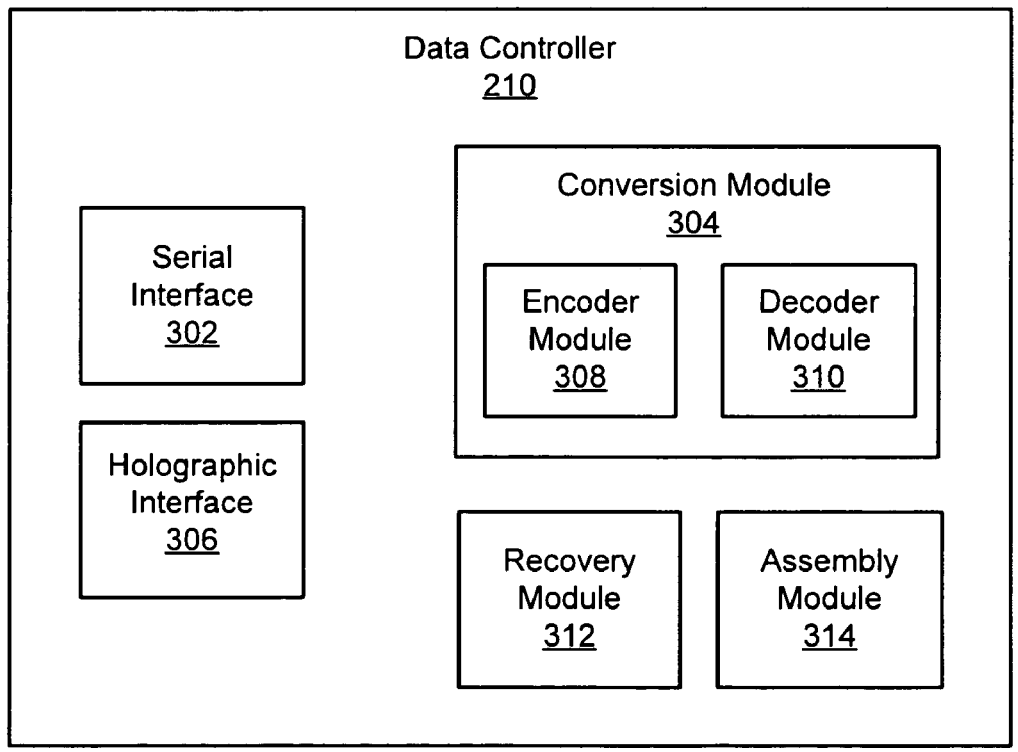
FIG. 3B is a detailed schematic block diagram illustrating one embodiment of an apparatus for converting between serial data and encoded holographic data.

FIG. 3B illustrates one further embodiment of the data controller 210. In one embodiment, the data controller 210 includes the serial interface 302, conversion module 304, and holographic interface 306 as described with relation to FIG. 3A. Additionally, the conversion module 304 may comprise an encoder module 308 and a decoder module 310. In one embodiment, the data controller 210 may additionally, comprise a recovery module 312 and an assembly module 314.

The encoder module 308 may utilize various specific circuits, and various encoding algorithms to generate encoded matrices for holographic storage. In particular, the encoding module 308 may use convolution encoding to generate the matrices from serial data inputs. The encoder module 308 is discussed in more detail with relation to FIG. 4 and FIG. 5. Various convolution encoding algorithms may be implemented such as ¼ rate convolution encoding with n=4 outputs, k=1 input, and m=3 levels of delay (4,1,3). Such an algorithm would generate a 2×2 matrix for each data bit received from the serial data connection. Alternatively, an 8/9 convolution encoding algorithm may be implemented to yield 3×3 matrices or a 24/27 convolution encoding algorithm to yield 3×3×3 matrices.

In the case of the 3×3×3 matrices, each layer of the three dimensional image may be stored on a separate storage medium 218. Alternatively, each layer may be overlaid using different frequencies of carrier and reference light. In another alternative embodiment, each layer may be recorded on separate physical depths within the holographic storage medium cross-section.

The decoder module 310 is configured to convert between holographic encoded data images and serial data streams. Additionally, the decoder module 310 may extract information from the data images used to recover lost or corrupt data. In one embodiment, the decoder module 310 may be implemented with a software or firmware program of instructions running on a processor, Field Programmable Gate Array ("FPGA"), or the like. Alternatively, the decoder module 310 may be implemented using a hardware circuit. Preferably, the decoder module 310 decodes the matrices in accordance with a trellis decoding diagram.

In one embodiment, the recovery module 312 is configured to use information regarding missing or corrupt data obtained by the decoding module 310 to recover the missing data. Each encoded matrix of data includes information pertaining to the values of the adjacent data in a convolution encoding scheme. Thus, missing data may be recovered if adjacent data is valid and available. The recovery module 312 is discussed further with relation to FIGS. 6, 7, and 10.

In one embodiment, the assembly module 314 is configured to assemble matrices generated by the conversion module 304 for storage on the holographic storage medium 218. In certain embodiments, the assembly module 314 may comprise a data switch, and one or more data caches 214. In certain embodiments, a processor 212 may route the matrices to the data caches 214. Additionally, the assembly module may be configured to distribute the matrices among a plurality of holographic storage mediums 218 according to a predetermined pattern. For example, if data integrity is to be preserved, two of every three matrices must be valid and available to recover from errors on the third. In such an example, it may be beneficial to distribute the matrices across three separate storage mediums 218 in alternating order. Thus, if one of the mediums 218 is corrupted or lost, the data from that storage medium 218 may be recovered by the recovery module 312 from the data stored on the associated two storage mediums 218. In another embodiment, the assembly module compiles groups of matrices for simultaneous storage on the holographic storage medium. In such an embodiment, a cache 214 is filled and then the data is displayed on a multi-pixel SLM 112. The image 110 is then recorded with a single pulse of laser light.

Figure 4:
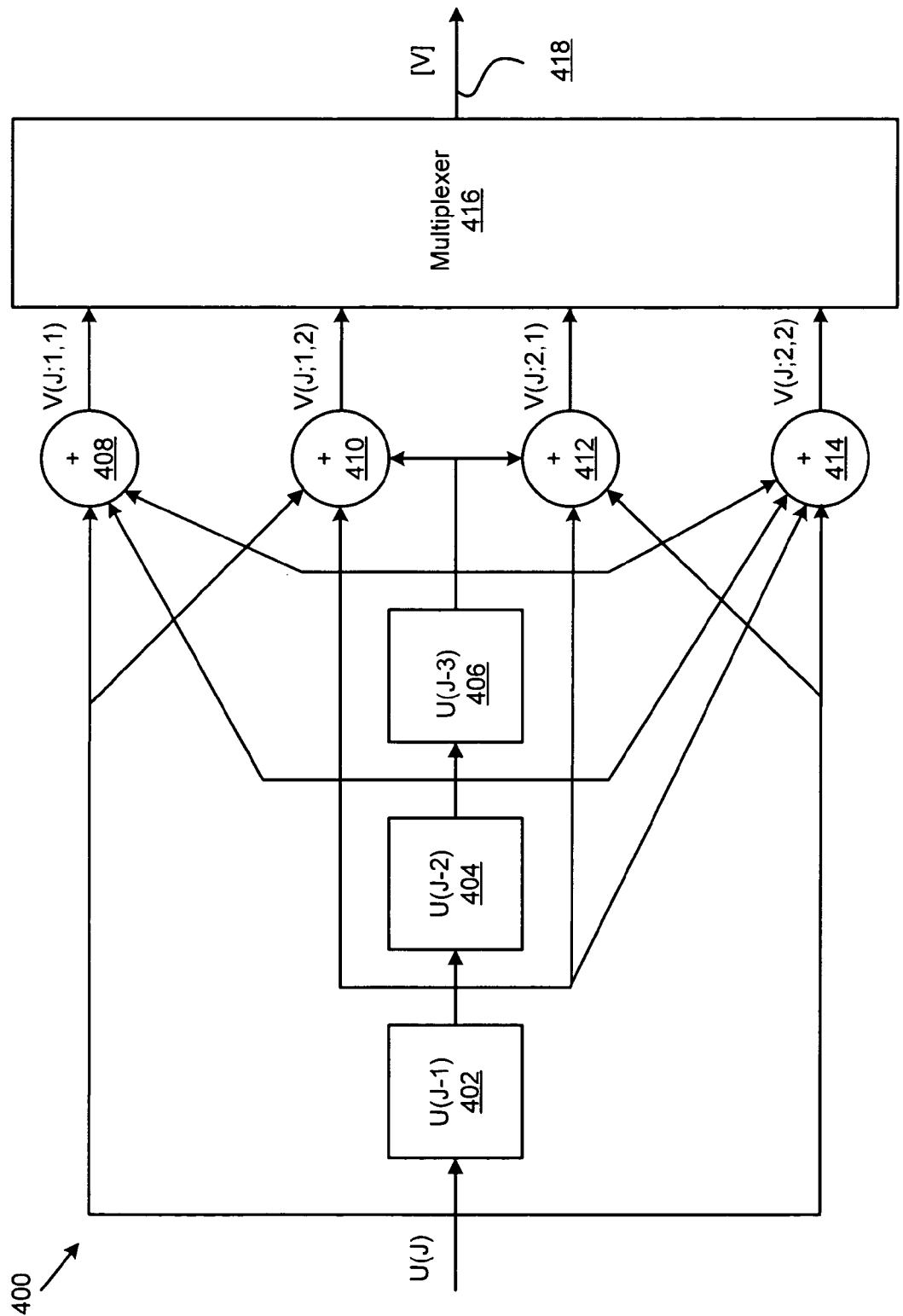
FIG. 4 is a schematic circuit diagram illustrating one embodiment of a convolution encoder circuit.

FIG. 4 illustrates one embodiment of an encoder circuit 400. The encoder circuit 400 may include a plurality of delay gates 402-406, and a plurality of adder gates 408-414. Additionally, the encoder circuit may comprise a multiplexer for aggregating the outputs of the four adder gates 408-414. In various embodiments, the number of delay gates 402-406 and adder gates 408-414 may differ depending on the encoding algorithm to be implemented.

The delay gates 402-406 may comprise shift registers. Alternatively, flip-flop gates may be used to implement the desired state delay. In such embodiments, the first delay gate 402 takes its input value and shifts it to its output value according to a clock signal. Various implementations based on clock signal may be implemented. For example, the first delay gate 402 may transition on a rising clock edge, or a falling clock edge. On a subsequent clock edge, the second delay gate 404 takes the output of the first delay gate 402 and shifts it to the output of the second delay gate 404, while the first delay gate 402 shifts a new value to its output. In such an embodiment, historical signal data is maintained by the delay gates 402-406.

For convolution encoding, the signals on the outputs of the delay gates 402-406 are added in accordance with the illustrated layout. The output of each adder 408-414 represents one value of the encoded matrix. For example, the output of the first adder 408 represents $V(J;1,1)$ of an encoded matrix, and so on for the remaining adder outputs. Since data from multiple delay gate outputs are combined by the adders, the resulting encoded matrix inherently contains the historical signal data stored in the delay gates 402-406. Thus, convolution encoded data inherently contains recovery information, because both the matrix prior to and the matrix subsequent to a given matrix contains information regarding the values of that matrix. From this information, it is possible to extrapolate the actual values of the given matrix. The state diagram 500 describe with relation to FIG. 5 may better illustrate the algorithm implemented by the encoder circuit 400.

Figure 5:
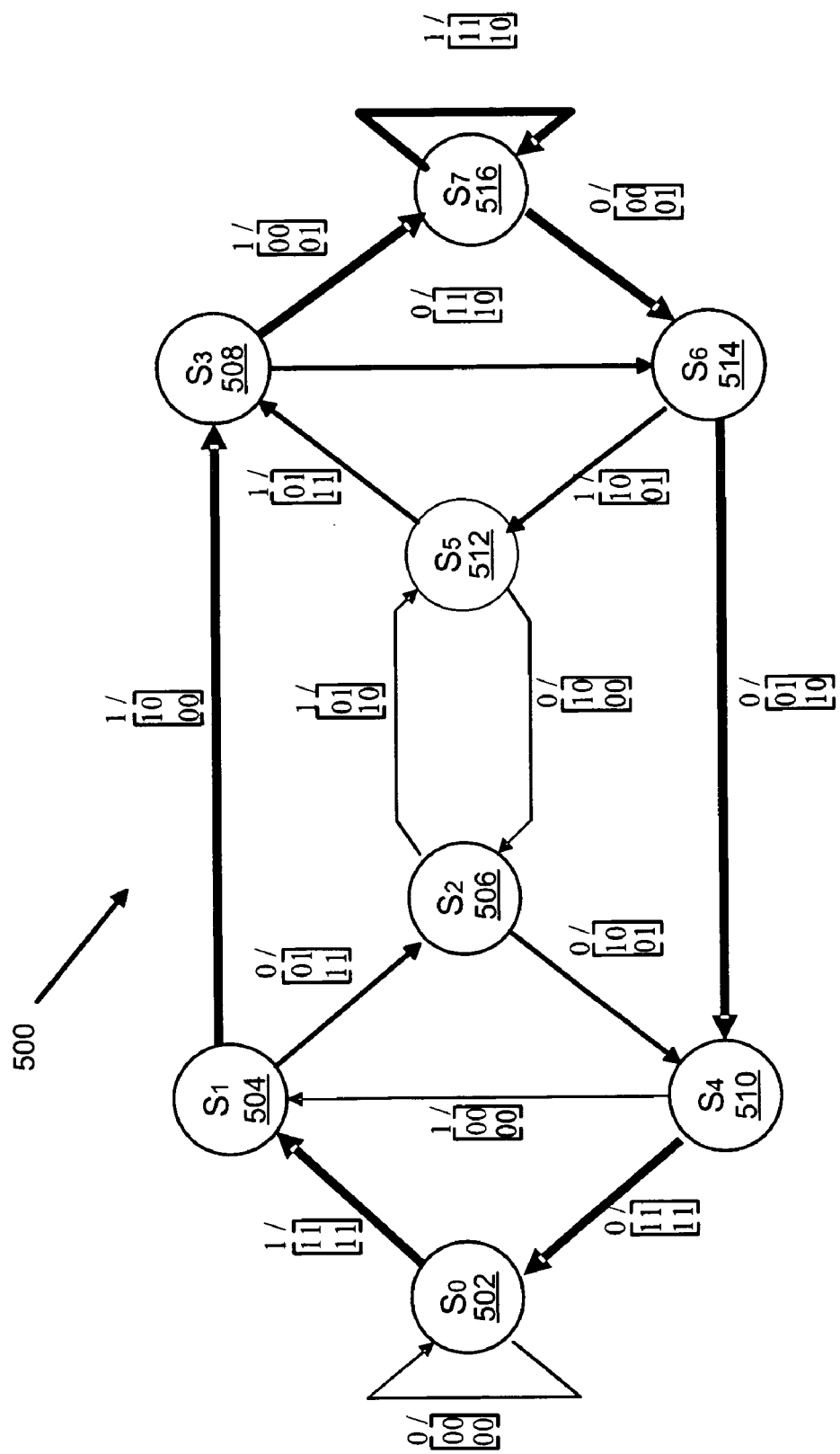
FIG. 5 is a state diagram illustrating the matrix states resulting from convolution encoding.

FIG. 5 is a state diagram 500 illustrating the matrix states resulting from convolution encoding serial data. The state diagram 500 comprises eight states; $S_0$ 502, $S_1$ 504, $S_2$ 506, $S_3$ 508, $S_4$ 510, $S_5$ 512, $S_6$ 514, and $S_7$ 516. Discrete jumps between states, in state diagram 500, are limited in number and direction. For example, the encoding process starting at state $S_0$ 502 can only jump back to $S_0$ 502 or $S_1$ 504. Similarly, the process from $S_1$ 504 can only jump to $S_2$ 506 or $S_3$ 508, etc. Each jump between states in state diagram 500 results in the encoding of one bit of input data into a two-by-two bit matrix.

There are a total of sixteen rows in Table 1, based on a total of eight states in state diagram 500 and two possible jumps from one specific state to the next immediately-possible states. Table 1 was generated via state diagram 500. However, table 1 makes it easier to visualize the encoding process.

TABLE 1

| Initial State | Destination State | Original Serial Data U | Encoded Data Array V(1, 1) V(1, 2) V(2, 1) V(2, 2) |
|---|---|---|---|
| S0 | S0 | 0 | 00 00 |
| S0 | S1 | 1 | 11 11 |
| S1 | S2 | 0 | 01 11 |
| S1 | S3 | 1 | 10 00 |
| S2 | S4 | 0 | 10 01 |
| S2 | S5 | 1 | 01 10 |
| S3 | S6 | 0 | 11 10 |
| S3 | S7 | 1 | 00 01 |
| S4 | S0 | 0 | 11 11 |
| S4 | S1 | 1 | 00 00 |
| S5 | S2 | 0 | 10 00 |
| S5 | S3 | 1 | 01 11 |
| S6 | S4 | 0 | 01 10 |
| S6 | S5 | 1 | 10 01 |
| S7 | S6 | 0 | 00 01 |
| S7 | S7 | 1 | 11 10 |

For example, when the encoder circuit 400 is reset, all values are set to '0'. If a serial data signal "U(j)" is applied to the input of the encoder circuit, the states may change in accordance with the data received. If the first bit received is a '0' bit, the states remain the same. This is illustrated by the returning arrow from state S0 502 to state S0 502 on the state diagram 500. If the first bit is a '1' bit, then the input is added on each of the four adder gates 408-414. Thus, the output 418 of the encoder circuit becomes [1,1;1,1]. If the next bit received is a '0' bit, then the '1' bit is shifted to U(j−1) and added to the second adder gate 410, the third adder gate 412, and the fourth adder gate 414, but not the first adder gate 408 as shown. The '0' bit is added in addition on each of the four adder gates 408-414. The resultant matrix 418 is [0,1;1,1], and so on for each additional bit received by the circuit. This is shown in Table 1. Initially the state is S0 502 and the matrix values are [0,0;0,0]. The '1' bit moves the circuit to state S1 504 and the output matrix values are [1,1;1,1]. If the next bit is a '0' bit, the circuit moves from state S1 504 to state S2 506 as shown in the table, and the output matrix values are [0,1; 1,1].

Figure 6:
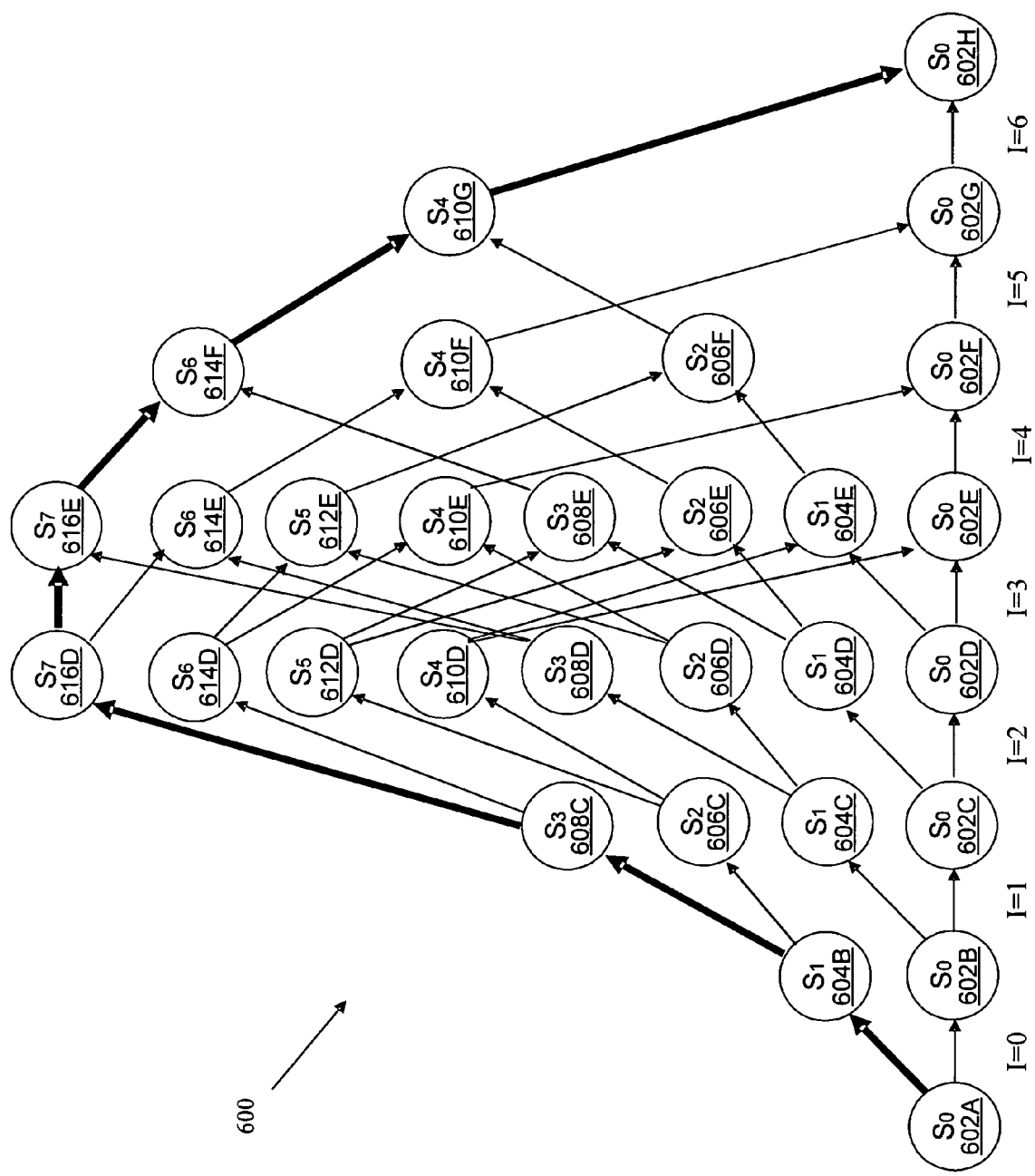
FIG. 6 is a state diagram illustrating trellis decoding.

FIG. 6 is a state diagram 600 illustrating a trellis diagram. Decoding using a trellis algorithm is often referred to as Partial Response Maximum Likelihood ("PRML") decoding. Alternately, a "stack algorithm" could be used for this decoding, and the same result achieved. States $S_0$-$S_7$ are shown in Table 1, and it is assumed that the initial contents of the delay gates 402-406 are all zero, so that trellis diagram 600 begins at state $S_0$ 602A. From $S_0$ 602A, the state jumps to either $S_0$ 602B or $S_1$ 604B. The increase from suffix A to suffix B in the numbering of the states in the trellis diagram 600 is called a branch, and the branch index I is zero when jumping from suffix A to suffix B. From $S_0$ 602B, the state jumps to either $S_0$ 602C or $S_1$ 604C; and from $S_1$ 604B, jumps to either $S_2$ 606C or $S_3$ 608C, and the branch index I is 1. From $S_0$ 602C, the state jumps to either $S_0$ 602D or $S_1$ 604D; from $S_1$ 604C jumps to either $S_2$ 606D or $S_3$ 608D; from $S_2$ 606C jumps to either $S_4$ 610D or $S_5$ 612D; or from $S_3$ 608C jumps to either $S_6$ 614D or $S_7$ 616D, and the branch index I is 2.

The next series of jumps in trellis diagram 600 show the full breath of the decoding effort. From $S_0$ 602D the state jumps to either $S_0$ 602E or $S_1$ 604E; from $S_1$ 604D jumps to either $S_2$ 606E or $S_3$ 608E; from $S_2$ 606D jumps to either $S_4$ 610E or $S_5$ 612E; or from $S_3$ 608D jumps to either $S_6$ 614E or $S_7$ 616E, and the branch index I is 3. Also, From $S_7$ 616D the state jumps to either $S_7$ 616E or $S_6$ 614E; from $S_6$ 614D jumps to either $S_5$ 612E or $S_4$ 610E; from $S_5$ 614D jumps to either $S_3$ 608E or $S_2$ 606E; or from $S_4$ 610D jumps to either $S_1$ 604E or $S_0$ 602E.

Typically, what is shown for branch index I=3 is repeated a plurality of times in a trellis diagram. However, brevity permits only one such iteration in FIG. 6. For the rest of FIG. 6, the trellis diagram is shown to conclude, indicating the ending of the decoding process. From $S_0$ 602E, the state jumps only to $S_0$ 602F; from $S_1$ 604E jumps only to $S_2$ 606F; from $S_2$ 606E jumps only to $S_4$ 610F; and from $S_3$ 608E jumps only to $S_6$ 614F, and the branch index I is 4. Also, from $S_7$ 616E, the state jumps only to $S_6$ 614F; from $S_6$ 614E jumps only to $S_4$ 610F; from $S_5$ 612E jumps only to $S_2$ 606F; and from $S_4$ 610E jumps only to $S_0$ 602F. From $S_0$ 602F, the state jumps only to $S_0$ 602G; and from $S_2$ 608F jumps only to $S_4$ 610G; and the branch index I is 5. Also, from $S_6$ 614F, the state jumps only to $S_4$ 610G; and from $S_4$ 610F jumps only to $S_0$ 602G. Finally, from $S_0$ 602G, the state jumps only to $S_0$ 602H; and the branch index I is 6. Also, from $S_4$ 610G, the state jumps only to $S_0$ 602H.

Beneficially, if the matrices are distributed across a plurality of holographic storage mediums, missing data may be recovered using the trellis state diagram 600 and associated decoding algorithms. Since the matrix representing each encoded bit includes information regarding adjacent data bits in the serial input, data missing in the middle of two available matrices may be extrapolated.

Figure 7:
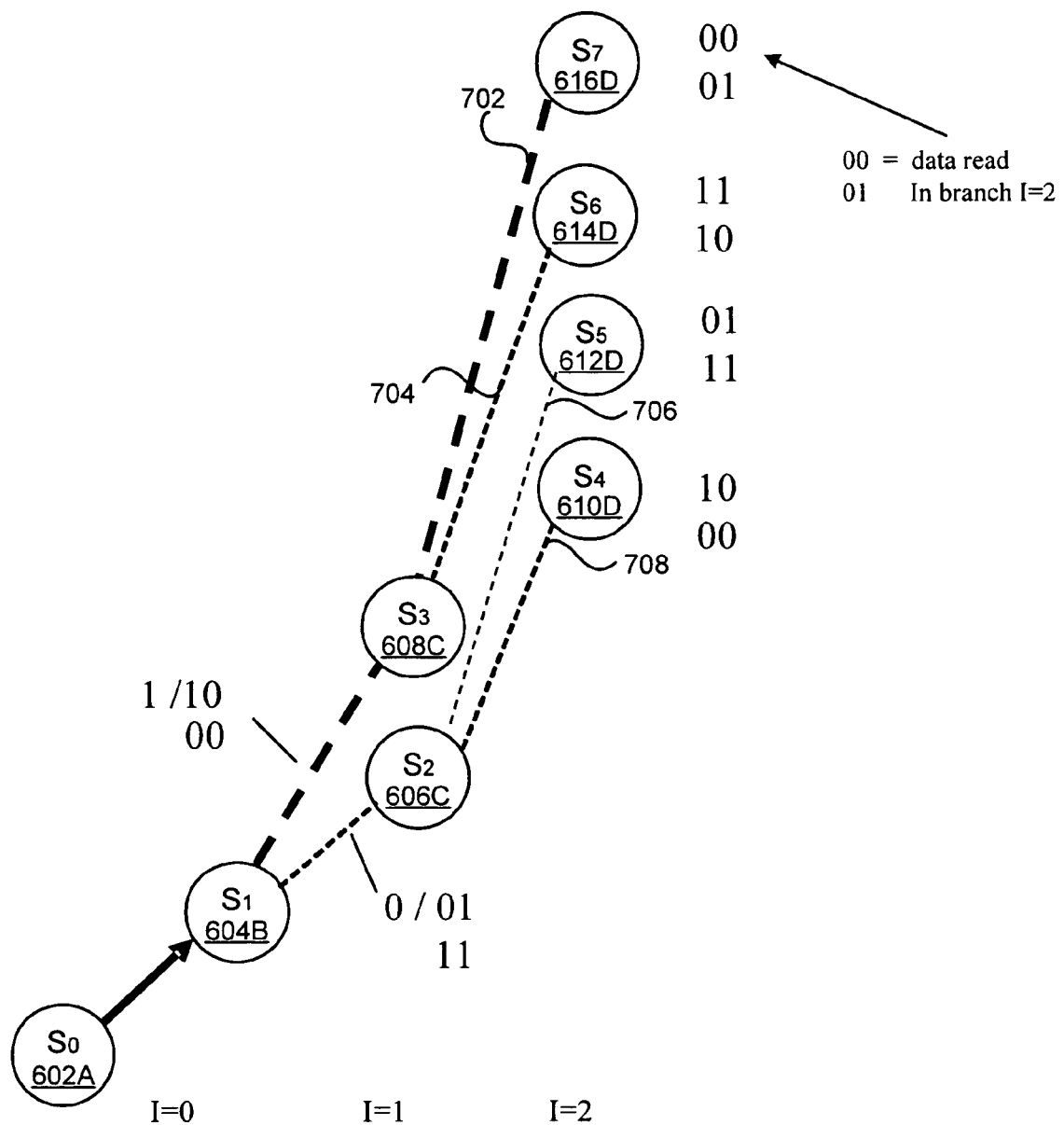
FIG. 7 is a state diagram illustrating one example of data recovery using trellis decoding.

FIG. 7 is a brief example of the reconstruction of missing data. It is assumed that the data in each branch I is stored on a different piece of holographic media and one of the pieces of holographic media was destroyed. Alternately, the data could be stored all on the same piece of holographic media and a section of that holographic media was lost due to poor signal-to-noise ratio, media failure, white noise, etc. In FIG. 7, the entire contents of branch I=1 are missing. By skipping ahead to branch I=2, reading the encoded data which for this example is [0,0;0,1], and comparing that encoded data to the four possible paths in branch I=2, it is easy to see that the branch from $S_3$ 608C to $S_7$ 3616D is the correct path because there is zero error (zero Hamming distance) between the encoded data [0,0;0,1] LU read and the encoded data [0,0;0,1] associated with that path. Since the start of branch I=2 is now known to be $S_3$ 608C, that must be the destination state of missing branch I=1. Thus, the missing path for I=1 is reconstructed as $S_1$ 604B to $S_3$ 608C. Thus, the encoded data in previously missing branch I=1 has been reconstructed and may be either rewritten to a spare piece of holographic media if the data had originally been spread across a plurality of holographic storage media in a RAID-like fashion, or rewritten is a spare area of the existing holographic media if all of the encoded data had been stored on a single piece of holographic storage media.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method, Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
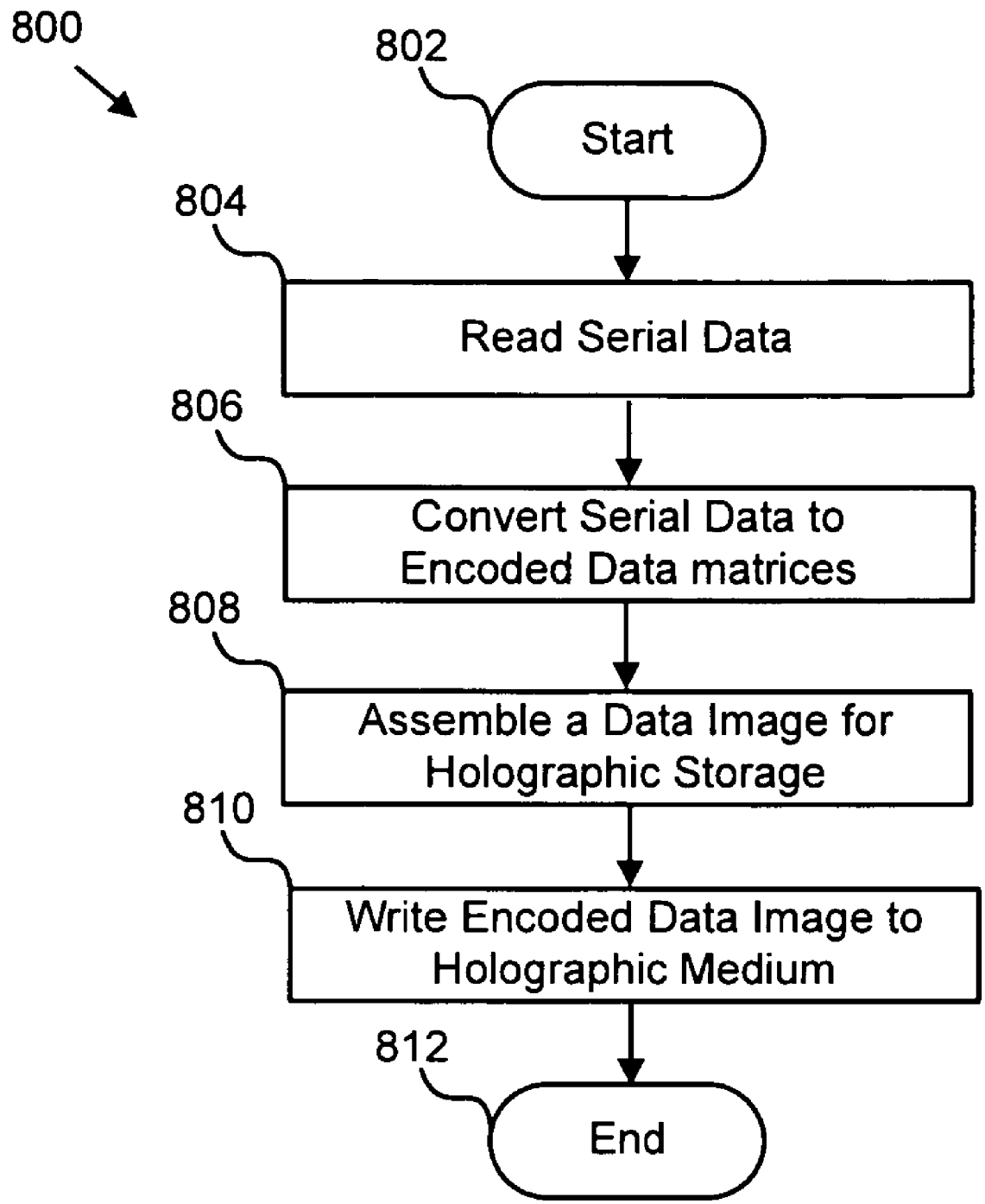
FIG. 8 is a schematic flow chart diagram illustrating one embodiment of a method for converting serial data into an encoded holographic image.

FIG. 8 illustrates one embodiment of a method 800 for converting serial data into an encoded holographic data image. In one embodiment, the method starts 802 when the serial data interface 302 reads 804 data bits from a serial data connection. The encoder module 308 then encodes 806 the serial data bits into matrices of encoded data. In one embodiment, the encoder module 308 may utilize an encoder circuit 400 as illustrated in FIG. 4 to perform the encoding operation. The assembly module 314 may assemble 808 a data image for holographic storage. The holographic data interface 306 may then write 810 the assembled data image to a holographic storage medium 218. The method 800 then ends 812.

Figure 9:
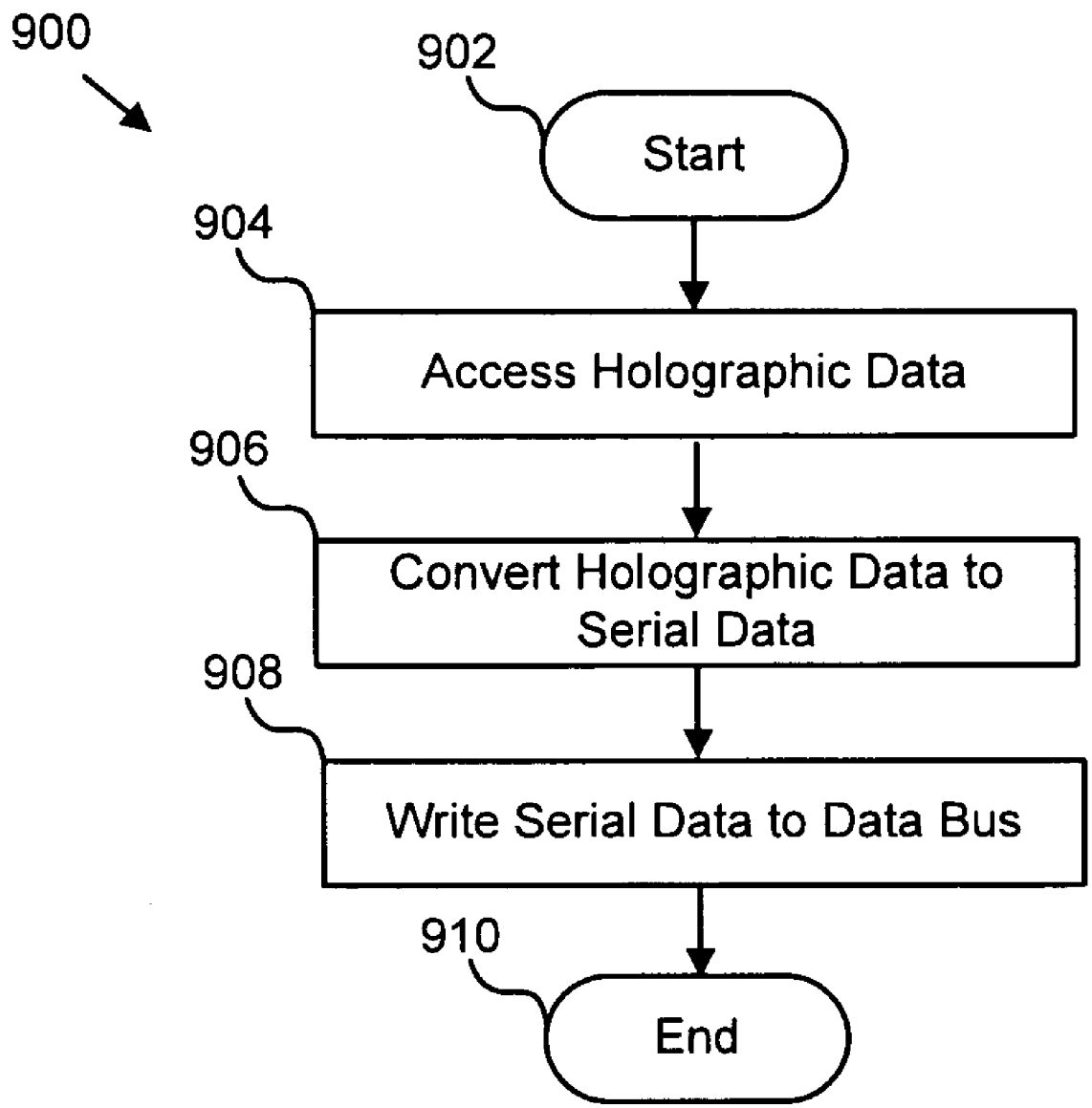
FIG. 9 is a schematic flow chart diagram illustrating one embodiment of a method for converting an encoded holographic image into serial data.

FIG. 9 illustrates one embodiment of a method 900 for converting a holographic data image into a serial data stream. In one embodiment, the method 900 starts 902 when the holographic data interface 306 accesses 904 a data image stored on a holographic storage medium 208. The decoder module 310 may then convert 906 the holographic data image into a serial data stream via a trellis decoder or a stack diagram. In one particular embodiment, corrupt or missing data may be recovered from information stored in the encoded data image. The serial data interface 302 may then write 908 the serial data stream to a serial data connection, and the method ends 910.

Figure 10:
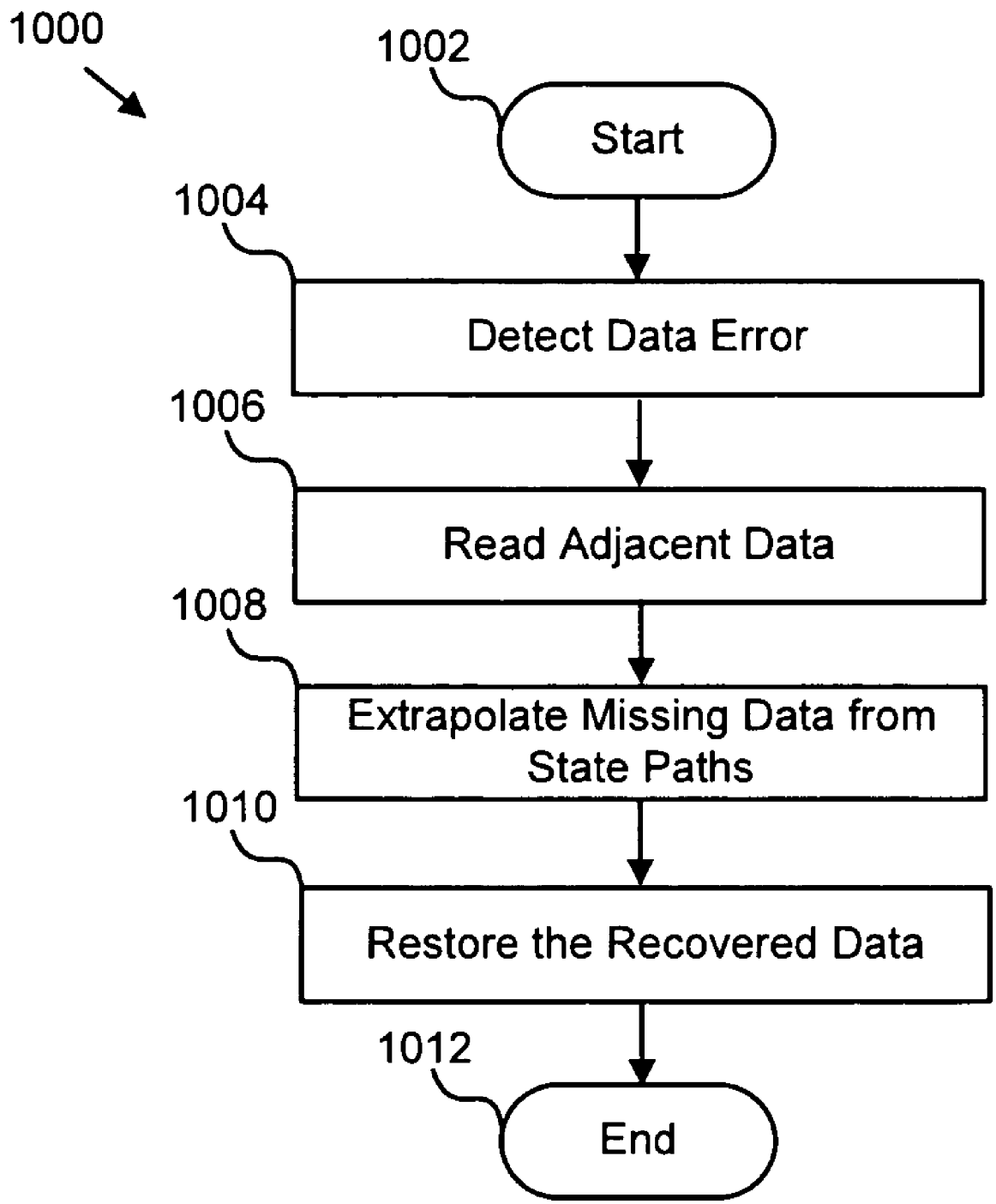
FIG. 10 is a schematic flow chart diagram illustrating one embodiment of a method for data recovery in accordance with the present invention.

FIG. 10 illustrates on embodiment of a method 1000 for data recovery. In one embodiment, the method 1000 starts 1002 when an error in the data is detected 1004. In response to a detected error, the decoder module 310 may read 1006 the data from matrixes adjacent to the corrupt matrix according to the sequence in which the data was received. The recovery module 312 may then extrapolate 1008 the missing data from the state path between the matrix prior to the missing data and the matrix following the missing data. From the state path in the trellis diagram, the missing data may be recovered. The recovery module 312 may then restore 1010 the recovered data to a spare storage medium 218. Alternatively, the recovery module 312 may restore 1010 the recovered data to a new location on the holographic storage medium 218. The method 1000 then ends 1012.

Beneficially, the disclosed embodiments of the apparatus, system, and method for converting between serial data and encoded holographic data, make use of improvements in data storage capacity and transfer rates made possible by holographic data storage to store backup information directly with the data stored on the storage device. This is achieved using convolution encoding. Furthermore, the use of a recovery module 312 to extrapolate missing data from surviving data may mitigate or entirely eliminate the need for separate backup copies of data, along with the updates, maintenance, cost, and other system resource impacts associated with data backup and recovery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for converting between serial data and encoded holographic data, the apparatus comprising:
   a conversion module configured to convert between a serial data stream and an encoded data image;
   a serial data interface configured to facilitate data communication between the conversion module and a serial data connection; and
   a holographic data interface configured to facilitate data communication between the conversion module and a holographic storage medium.

2. The apparatus of claim 1, wherein the conversion module further comprises an encoding module configured to encode serial bits of data received from the serial data interface into matrices of convolution encoded data.

3. The apparatus of claim 2, wherein the encoding module is further configured to generate a two dimensional matrix for storage on the holographic medium.

4. The apparatus of claim 2, wherein the encoding module is further configured to generate a three dimensional matrix for storage on the holographic medium.

5. The apparatus of claim 1, wherein the conversion module further comprises a decoding module configured to trellis decode encoded matrices received from the holographic storage medium into serial bits of data.

6. The apparatus of claim 5, further comprising a recovery module configured to use information regarding missing data obtained by the decoding module to recover the missing data.

7. The apparatus of claim 1, further comprising an assembler module configured to assemble a group of encoded data into an optical image for simultaneous storage on a holographic medium.

8. The apparatus of claim 7, wherein the assembler module further comprises a distribution module configured to distribute the matrices among a plurality of holographic storage mediums according to a predetermined pattern.

9. A system for converting between serial data and encoded holographic data, the system comprising:
   a computing device with a serial data bus;
   a data controller configured to:
      read data signals from and write data signals to a serial data bus on the computing device;
      convert between a serial data stream and a convolution encoded data image; and
      read data from and write data to a holographic storage medium; and
   a holographic storage medium.

10. The system of claim 9, wherein the data controller is further configured to distribute the convolution encoded data images across a plurality of holographic storage mediums.

11. The system of claim 10, wherein the data controller is further configured to recover data missing from a first set of holographic data using information obtained from trellis decoding one or more associated sets of holographic data.

12. The system of claim 11, wherein the sets of holographic data are stored on separate storage mediums.

13. A computer readable medium tangibly embodying a program of machine-readable instructions executable by a digital processing apparatus to perform operations for converting between serial data and encoded holographic data, the operations comprising:
- interfacing a conversion module with a serial data connection to facilitate data communication between the conversion module and the serial data connection;
- converting between a serial data streams and an encoded data image; and
- interfacing with the conversion module with a holographic storage medium to facilitate data communication between the conversion module and the holographic storage medium.

14. The computer readable medium of claim 13, wherein the conversion operation further comprises an encoding operation configured to encode serial bits of data received from the serial data interface into matrices of convolution encoded data.

15. The computer readable medium of claim 14, wherein the encoding operation is further configured to generate a two dimensional matrix for storage on the holographic medium.

16. The computer readable medium of claim 14, wherein the encoding operation is further configured to generate a three dimensional matrix for storage on the holographic medium.

17. The computer readable medium of claim 13, wherein the conversion operation further comprises a decoding operation configured to trellis decode encoded matrices received from the holographic storage medium into serial bits of data.

18. The computer readable medium of claim 17, further comprising a recovery operation configured to use information regarding missing data obtained by the decoding module to recover the missing data.

19. The computer readable medium of claim 13, further comprising an assembly operation configured to assemble a group of encoded data into an optical image for simultaneous storage on a holographic medium.

20. The computer readable medium of claim 19, wherein the assembly operation further comprises a distribution operation configured to distribute the matrices among a plurality of holographic storage mediums according to a predetermined pattern.

21. A method for converting between serial data and encoded holographic data, the method comprising:
- reading data signals from a serial data bus;
- writing data signals to a serial data bus;
- converting between a serial data stream and a convolution encoded data image;
- reading data from a holographic storage medium; and
- writing data to a holographic storage medium.

22. The method of claim 21, further comprising distributing the convolution encoded data images across a plurality of holographic storage mediums.

23. The method of claim 22, further comprising trellis decoding one or more associated sets of holographic data and recovering data missing from a first set of holographic data using information obtained from the trellis decoding of the one or more associated sets of holographic data.

24. The method of claim 23, wherein the sets of holographic data are stored on separate storage mediums.

* * * * *